United States Patent [19]

Koehn

[11] 4,415,174
[45] Nov. 15, 1983

[54] MULTIPLE IMPLEMENT TOWING APPARATUS

[76] Inventor: Gary Koehn, N. Sedan Rte. Box 259, Dalhart, Tex. 79022

[21] Appl. No.: 332,514

[22] Filed: Dec. 21, 1981

[51] Int. Cl.³ .............................................. B60D 1/14
[52] U.S. Cl. ................................ 280/411 C; 172/314; 172/679; 280/412; 280/415 R
[58] Field of Search ........... 280/411 C, 411 A, 411 R, 280/412, 413, 415 R; 172/677, 679, 314, 310, 313, 324

[56] References Cited

U.S. PATENT DOCUMENTS

| | | | |
|---|---|---|---|
| 1,237,616 | 8/1917 | Clark | 280/412 |
| 2,552,770 | 5/1951 | D'Artenay | 280/412 |
| 3,003,789 | 10/1961 | Calkins | 280/411 A |
| 3,292,948 | 12/1966 | McMasters et al. | 280/412 |
| 3,419,284 | 12/1968 | Tibbals | 280/412 |
| 3,990,718 | 11/1976 | Holland | 280/412 |
| 4,135,582 | 1/1979 | Farrant | 172/280 |
| 4,162,085 | 7/1979 | Miranowski | 280/412 |
| 4,178,010 | 12/1979 | Gerber | 280/412 |
| 4,344,639 | 8/1982 | Pollard | 280/411 C |

FOREIGN PATENT DOCUMENTS 751342 7/1980 U.S.S.R. ........................... 280/411 C

Primary Examiner—Joseph F. Peters, Jr.
Assistant Examiner—Donn McGiehan
Attorney, Agent, or Firm—Cushman, Darby & Cushman

[57] ABSTRACT

A towing apparatus capable of being pulled over the ground by a single tractor and for towing multiple agricultural implements is provided with a main towing arm having at its end opposite the tractor hitch a vertically extending beam to which is pivotally attached for rotation in a horizontal plane a second towing arm which extends outwardly from opposite sides of the pivotal connection and has at its free end ground engaging wheels and towing hitches; a piston and cylinder device is mounted on the vertical beam of the main towing arm and is connected to a portion of the second towing arm to effect pivotal movement of the second towing arm in a horizontal plane to move the towed implements to an aligned on the road position and for moving the towed elements to an extended off the road position; the second towing arm is divided into a first and second portion, each of which has one end connected for pivotal movement about a horizontal axis to the pivot connection on the beam of the main towing arm.

8 Claims, 5 Drawing Figures

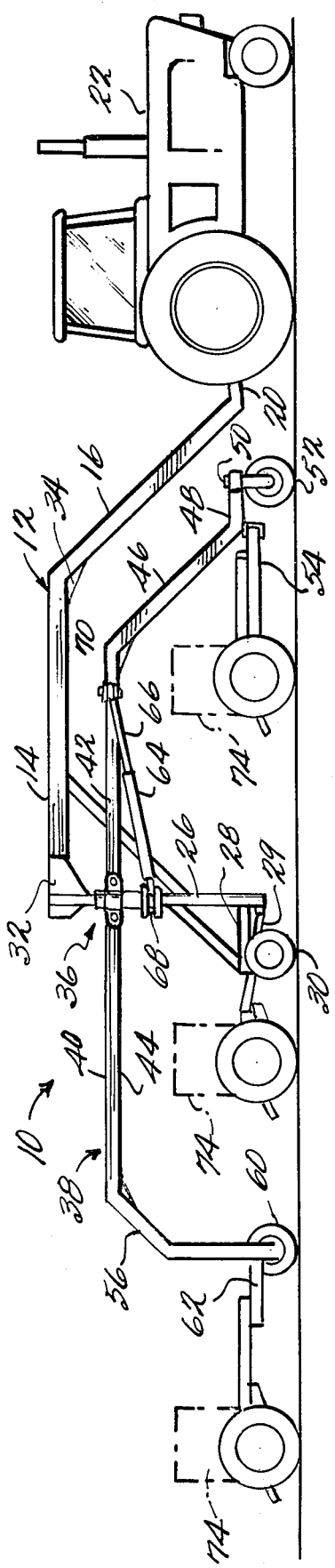
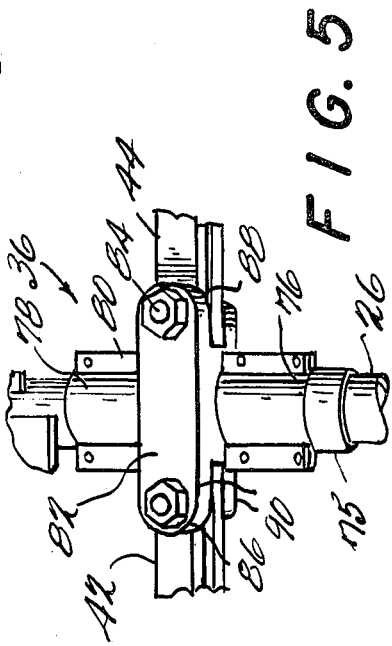
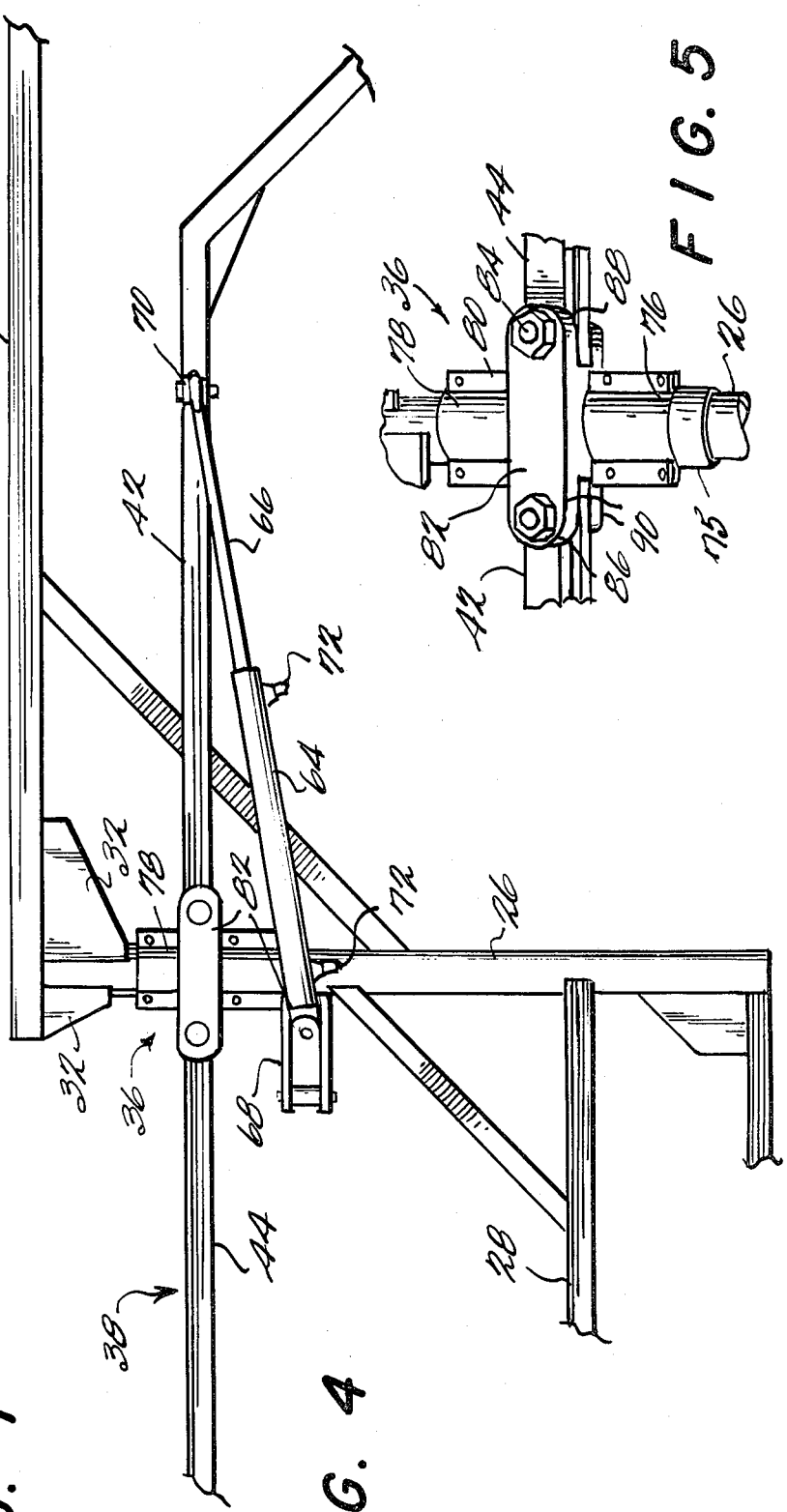

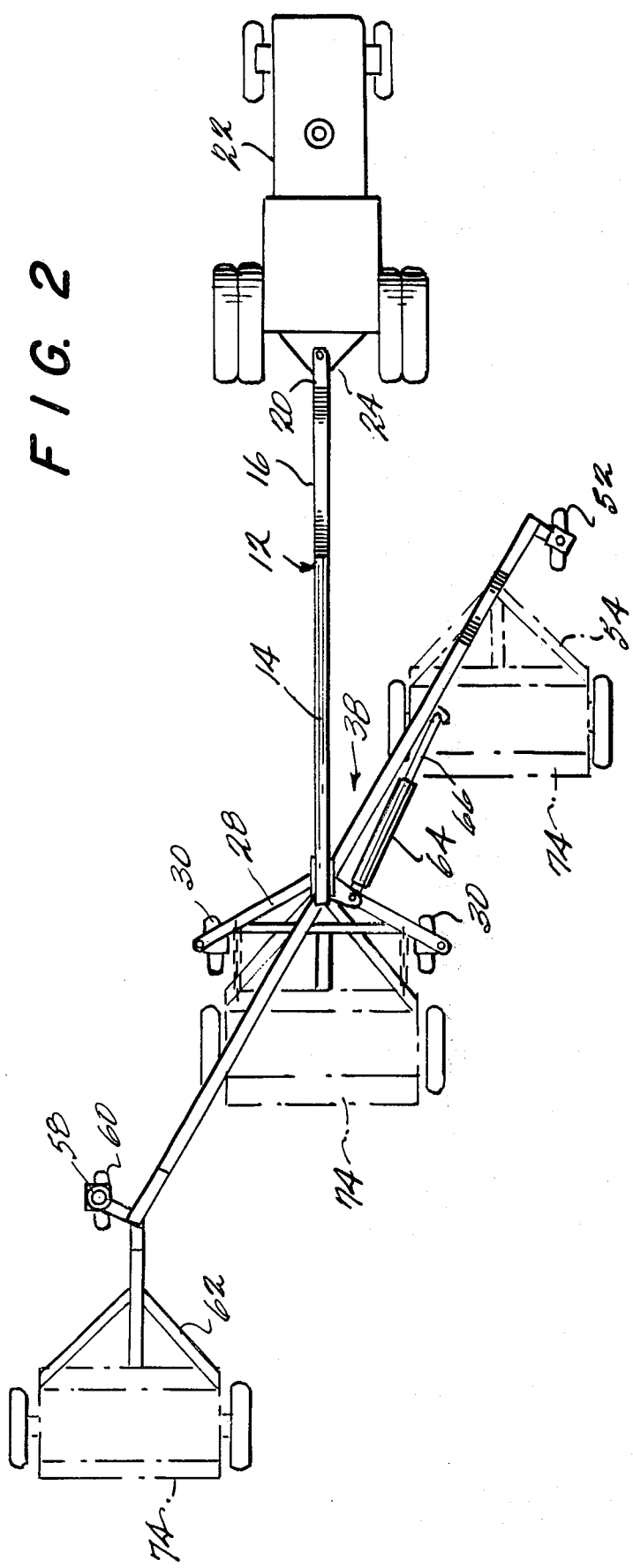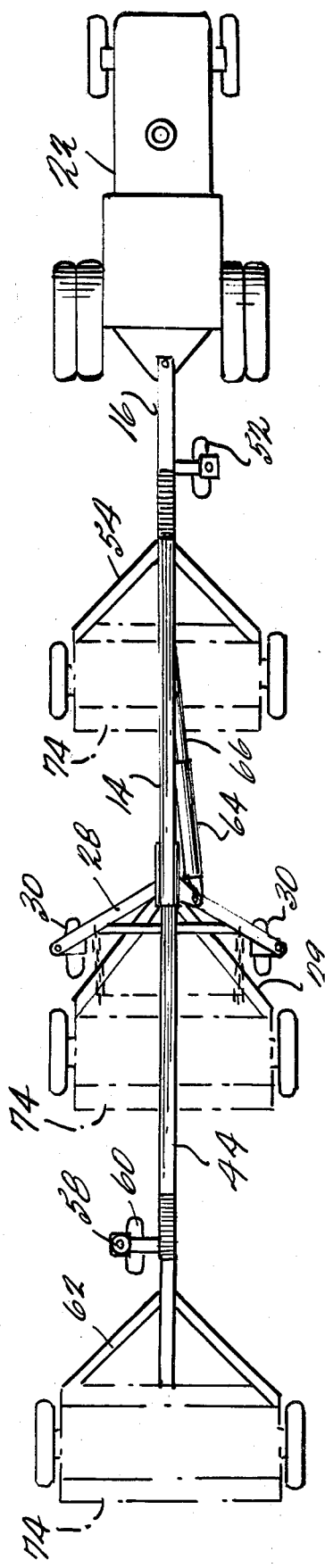

MULTIPLE IMPLEMENT TOWING APPARATUS

BACKGROUND AND BRIEF DESCRIPTION OF THE INVENTION

The present invention relates to towing devices of the type capable of towing a plurality of agricultural implements both on the road and in the field. More specifically, the towing apparatus of the present invention is capable of altering the disposition of the towed implements so that the implements will be in alignment for on the road travel and spread apart in the desired overlapping array for field use.

The prior art has proposed a variety of structures for towing multiple implements over the ground and for altering the array of the implements for on the road movement. However, the prior art devices have suffered from a number of deficiencies and disadvantages. Specifically, it has often been difficult to change the arrangement of the towed implements when it has become necessary for the tractor to move between the field and public highways or roads. Often it has been necessary for the tractor driver to stop the tractor and engage in complicated and time consuming rearrangement of the elements to render the implement array appropriate for either the road or field use. Also, in many arrangements, it has been difficult to arrange the towed implements in such a way as to maximize the surface area covered when the implements were being put to use in the field. In many arrangements, due to the surface area spanned by the elements of the towing apparatus, expensive structural reinforcements were required, particularly where the towed elements were being put to agricultural use over terrain that was rough and uneven and which therefore resulted in very high stresses being placed on the connecting elements of the towing apparatus.

In attempting to overcome the foregoing problems, the prior art has often failed to take into consideration the desirability of providing a towing apparatus that could accommodate a variety of different types of agricultural implements either in one towing operation or when it was desired to tow a plurality of different implements in a single pass over a field to accomplish simultaneously different agricultural functions.

In other arrangements, the towing apparatus has required structural modification of the tractor itself which is often undesirable due to the many other diverse uses such farming tractors are put during the course of a growing season.

In accordance with the present invention, a towing apparatus is provided which permits the simultaneous towing of up to three agricultural or other type implements and which can easily rearrange the disposition of these implements for on the road or field use. In one embodiment, a main towing arm is provided which has one end connectable to a motor driven vehicle such as a tractor and an opposite end provided with a vertical beam or post which is connected at its lower end to a wheel frame and to which one of the towed implements may be connected. Intermediate its end, the vertical post is provided with a double yoke which is rotatably mounted on the post and from which extends a second towing arm. The second towing arm has two portions each of which is connected to the yoke for pivotal movement about respective horizontal axes. The two portions of the second towing arm at thier free ends are each provided with ground engaging wheels and towing devices for connection to implements to be towed. The vertical post of the main towing arm spaces the main towing arm a sufficient distance above the ground to permit the second towing arm to rotate in a horizontal plane located beneath a portion of the main towing arm. Further, the vertical post of the main towing arm is provided with a hydraulic ram which has one end connected to the second towing arm to effect rotation of the second towing arm in a horizontal plane whereby the second towing arm can be moved from a position where it is in alignment with the direction of movement of the tractor for on the road travel to an extended position where the towed implements will be spread out behind the tractor.

It will be seen that in addition to the advantage of facilitating rapid rearrangement of the towed implements behind the tractor, the multiple pivot connection of the second towing arm will greatly relieve the frequently encountered stresses that are imposed on the various elements of the towing apparatus due to the traversing of uneven terrain in a field.

Other features and advantages of the present invention will become apparent as consideration is given to the following detailed description taken in conjunction with the following drawings.

BRIEF DESCRIPTION OF THE DRAWINGS

The present invention may be constructed in a variety of ways and one embodiment will be described in detail with reference to the drawings, of which:

FIG. 1 is a side view in elevation of a tractor pulling the towing apparatus of the present invention;

FIG. 2 is a top plan view with the towing apparatus arrayed for field use;

FIG. 3 is a top plan view with the towing apparatus arrayed in an on the road position;

FIG. 4 is a detail view of the pivot means of the present invention; and

FIG. 5 is an enlarged detail view of the pivot means taken from the side opposite that of FIG. 4 and partially in perspective and with parts broken away for clarity.

DETAILED DESCRIPTION OF THE INVENTION

Referring now to the drawings wherein like numerals designate corresponding parts throughout the several views, there is shown in FIG. 1 the towing apparatus of the present invention generally designated at 10. The towing apparatus 10 includes a main towing arm 12 which, in the present embodiment, has three segments. The first segment is a generally horizontally disposed first beam 14 which, at one end, has a second segment in the form of a second beam 16 extending at an angle downwardly therefrom towards a tractor hitching arm 20 as is more clearly shown in FIGS. 2 and 3. The hitching arm 20 may be connected in any suitable manner to the tractor 22 such as by the pin 24. At the other end of the first beam 14, a third beam or post 26 has one end rigidly secured to the end of first beam 14 and extends generally perpendicular to first beam 14. At its lower end, the third beam 26 is provided with a wheel frame 28 (see FIGS. 2 and 3) which is provided with a pair of wheels 30 spaced apart a suitable distance to impart stability to the main towing arm 12. Also, a towing hitch 29 is connected to the lower end of post 26. The connection between the third beam 26 and first beam 14 of the main towing arm 12 may be suitably reinforced by appropriately located weld plates 32 as is more clearly shown in FIG. 4. Similarly, a welded plate such as at 34 may be provided at the angular connection between first and second beams 14, 16 of the main towing arm 12 and at other similar junctures throughout the apparatus.

Beneath the juncture of the top end of third beam 26 and first beam 14, the pivot means generally designated at 36 is located on third beam 26 of the main towing arm 12 and which will be described in detail hereinafter. Attached to the pivot means 36 is the second or rotating towing arm 38 intermediate its ends so as to be rotatable or pivotable about a vertical axis which may be coincident with the vertical axis of beam 26. The second towing arm 38 includes a beam which, in the preferred embodiment, has a first portion 42 extending from one side of the pivot means 36 and a second portion 44 extending generally from the opposite side of the pivot means 36. Connected to the end of the first portion 42 opposite its connection to the pivot means 36 is a second beam 46 of the second towing arm which terminates at its free end 48 in a pivotal wheel mount 50 which supports a wheel 52. Also, adjacent the free end 48 there is provided a suitable implement towing hitch 54 which is connected in any conventional manner to the free end 48 of second beam 46.

To the end of second portion 44 opposite its connection to the pivot means 36, there is provided a generally downwardly projecting third beam 56 which is similarly provided with a pivot wheel mount 58 for supporting a wheel 60 at the lower end of the third beam 56. Also, there is provided at the lower end of the third beam 56 an implement towing device 62 which may be identical to that at 54.

Mounted on post 26 below the pivot means 36 is one end of a hydraulic cylinder 64 preferably by means of a universal mount 68 which permits the cylinder 64 to move about both a vertical and horizontal axis. Also, as shown more clearly in FIGS. 2 and 3, the universal mount 68 projects a small distance away from the axis of post 26. The movable arm 66 has one end connected to a piston located in the hydraulic cylinder 64 and its opposite end pivotally mounted at 70 on first portion 42 of the second towing arm 38. Suitable hydraulic hoses 72 will supply and exhaust hydraulic fluid to the cylinder 64 in the conventional manner and may be fed over the top of the main towing arm 12 to a hydraulic pump carried by the tractor 22.

As thus far described, the actuation of the towing apparatus of the present invention may be explained as follows.

With suitable towing implements such as schematically illustrated at 74 by broken lines, all of which may be the same or which may perform different functions, as desired, suitably hitched to the respective towing devices, as illustrated, in order to dispose the implements 74 for field use where the implements 74 each cover parallel swaths of land, the tractor operator need merely supply hydraulic fluid to the cylinder 64 to retract arm 66 to a point where a suitable disposition of the implements 74 is achieved such as that illustrated in FIG. 2. By retracting arm 66, the second towing arm 38 will be caused to rotate on pivot means 36 in a horizontal plane clockwise as viewed in FIG. 2. Then, when it is desired to tow the implements 74 on a public road, the tractor operator need merely extend arm 66 to rotate towing arm 38 counterclockwise as viewed in FIG. 2 to move the arm 38 and the implements towed thereby from their extended position of FIG. 2 to the retracted position as illustrated in FIG. 3 where each of the implements 74 are aligned behind the tractor 22 thereby decreasing the overall width of the apparatus as is required for highway travel. It should be noted that the movement of the second towing arm 38 relative to the main towing arm 12 can be effected while the tractor 22 is in motion as the wheels 52 and 58 are both pivotally mounted to swivel about a vertical axis to facilitate this movement.

Turning now to FIGS. 4 and 5, the pivot means 36 of the present invention will now be described.

As shown in FIG. 5, a collar 74 is located about the exterior of the third beam or post 26 at a selected distance from the top of the post 26. The collar 74 has an abutment surface 76 facing upwardly and on which the bottom end of a cylindrical sleeve 78 rests in sliding engagement therewith so that sleeve 78 which surrounds the exterior of post 26 along a length of the post 26 will be freely rotatable about post 26. As illustrated, sleeve 78 is of two parts which may be bolted or welded together along flanges 80 as desired. A double yoke or collar 82 is welded to the exterior of sleeve 78 so as to be rotatable therewith. At its opposite ends, the collar 82 is provided with pairs of aligned bolt holes in ears 90 for receiving bolts 84 and 86 which may be secured in place by welding or by threaded nuts 88 as illustrated. Between the ears 90 of the collar 82 the respective ends of the first and second portions 42 and 44, respectively, are inserted, each of which is provided with a through bore or aligned apertures through which the bolts 84 and 86, respectively, are inserted to securely mount the respective portions on the pivot means 36. With this arrangement, it will be seen that portions 42 and 44 may be pivoted independently of each other and independently of the main towing arm 12 about their respective horizontal axes defined by the bolts 84 and 86. In addition, as previously described, portions 42 and 44 will be rotatable about a vertical axis defined by the sleeve 78.

With the arrangement as thus described, it will be apparent that where the apparatus 10 is being drawn over uneven terrain, undue stress on the main towing arm 12 will be minimized since wheel 52 and/or the towing implement associated therewith will be free to move up or down relative to the main towing arm 12 without transmitting any substantial torque through post 26. The same applies equally to corresponding independent movements of wheel 60 and its associated towed implement 74. Similarly, where wheel 30 encounters uneven terrain, post 26 will move up or down with a minimum of stress being imparted to the first and second portions 42, 44 of the second towing arm 38.

It will be apparent to those skilled in this art that the dimensions of the various beam members and the location of the pivot means 36 on post 26 should be selected to permit the accommodation of a wide range of different types of agricultural or other types of implements for towing by the apparatus of the present invention.

It will also be apparent that with the arrangement as illustrated, hydraulic lines can be safely accommodated on the respective beams to feed hydraulic fluid to each of the implements 74 to permit control thereof by the tractor operator just as is the case with the hydraulic cylinder 64, as previously described.

It will be apparent to those skilled in this art that various modifications may be made to the illustrated embodiment without departing from the spirit and scope of this invention as defined in the appended claims.

What is claimed is:

1. A towing apparatus for towing at least two implements in selected positions relative to the towing vehicle, comprising:

a first arm means having one end for attachment to a towing vehicle and another end spaced a selected distance from said one end, pivot means mounted adjacent said another end, second arm means having an intermediate portion mounted on said pivot means for pivotal movement relative to said first arm means between a first, retracted position and a second, extended position, means for moving said second arm means between said first and second positions, said another end of said first arm means having implement towing means connected thereto and wheel means for supporting said another end of said first arm means for movement over the ground, said second arm means having first and second opposite ends spaced apart selected distances from said intermediate portion, said first and second ends each having wheel means for supporting each said respective end for movement over the ground with said second arm means in either said first, second or any intermediate position, said first and second ends each having implement towing means connected thereto, said first arm means comprising a first generally horizontally extending beam, a second beam having one end rigidly secured to an end of said first beam to extend generally downwardly therefrom, and a third beam rigidly secured at one end to the other end of said first beam to extend generally downwardly therefrom whereby said first beam is spaced a selected distance above the ground when said apparatus is in use.

2. The apparatus as claimed in claim 1 wherein said means for moving said second arm means includes an hydraulic means operable between said another end of said first arm means and said second arm means.

3. The apparatus as claimed in claim 1 wherein said pivot means is located on said third beam and spaced from the juncture of said first and third beams so that said second arm means is pivotable about a point located between the ground and said first beam of said first arm means.

4. The apparatus as claimed in claim 3 wherein said means for moving said second arm means has one end which is connected to said third beam of said first arm means and another end connected to said second arm means between said first end and said intermediate portion of said second arm means.

5. The apparatus as claimed in claim 1 wherein said second arm means comprises a first beam with said intermediate portion located thereon and connected to said pivot means, said pivot means being carried on said third beam of said first arm means at a point adjacent the juncture of said first and third beams of said first arm means so that said first beam of said second arm means is pivotable in a generally horizontal plane spaced a distance above the ground sufficient to provide clearance for the towed implements, said second arm means further including a second beam having one end connected to one end of said first beam and extending therefrom downwardly at an angle to the horizontal and a third beam having one end connected to the other end of said first beam, said second and third beams of said second arm means each having said respective opposite ends.

6. The apparatus as claimed in claim 1 wherein said third beam of said first arm means has adjacent its end opposite said one end thereof said means for towing an implement.

7. The apparatus as claimed in claim 6 wherein said third beam of said first arm means has at its end opposite said one end thereof a wheel frame and a pair of ground engaging wheels carried on said wheel frame in spaced apart relation to one another.

8. The apparatus as claimed in claim 5 wherein said third beam of said first arm means comprises, in the vicinity of said pivot means, a pipe having a circular cross-section along a length thereof, an abutment surface spaced from said one end of said third beam, said pivot means comprising a cylindrical sleeve surrounding at least a portion of said length of said pipe and being rotatable thereabout, said sleeve having one end thereof in sliding engagement with said abutment surface, said sleeve having yoke means secured thereto, said first beam of said second arm means having first and second portions each having one end thereof pivotally connected to said yoke means on substantially opposite sides of said sleeve so that said first and second portions are pivotable about generally horizontal axes while being rotatable with said sleeve about a generally vertical axis.

* * * * *